Figure 1:
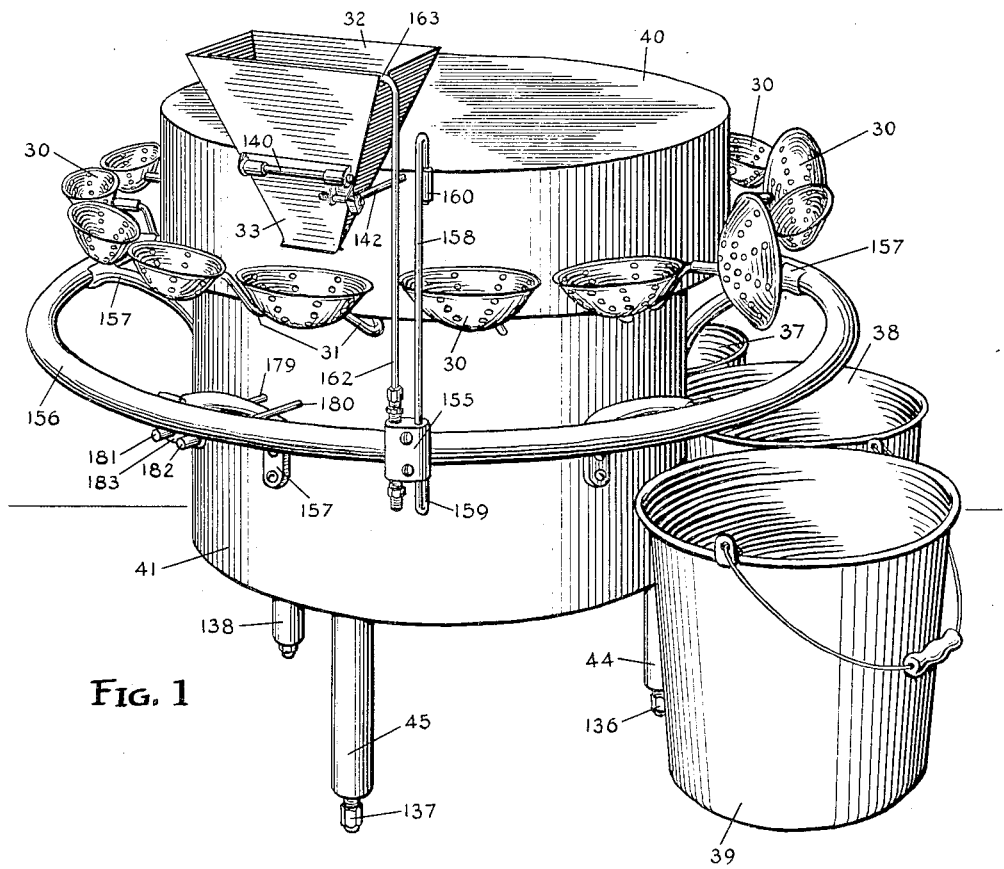

Oct. 31, 1939.  C. A. FAUSEL  2,178,203
WEIGHING AND SORTING MACHINE
Filed Aug. 25, 1937  4 Sheets-Sheet 1

INVENTOR.
Charles A. Fausel
Frank C. Fischer
ATTORNEYS.

Oct. 31, 1939.　　　C. A. FAUSEL　　　2,178,203
WEIGHING AND SORTING MACHINE
Filed Aug. 25, 1937　　　4 Sheets-Sheet 3

INVENTOR.
Charles A. Fausel
BY Fred C. Fischer
ATTORNEYS.

Oct. 31, 1939.  C. A. FAUSEL  2,178,203
WEIGHING AND SORTING MACHINE
Filed Aug. 25, 1937  4 Sheets-Sheet 4
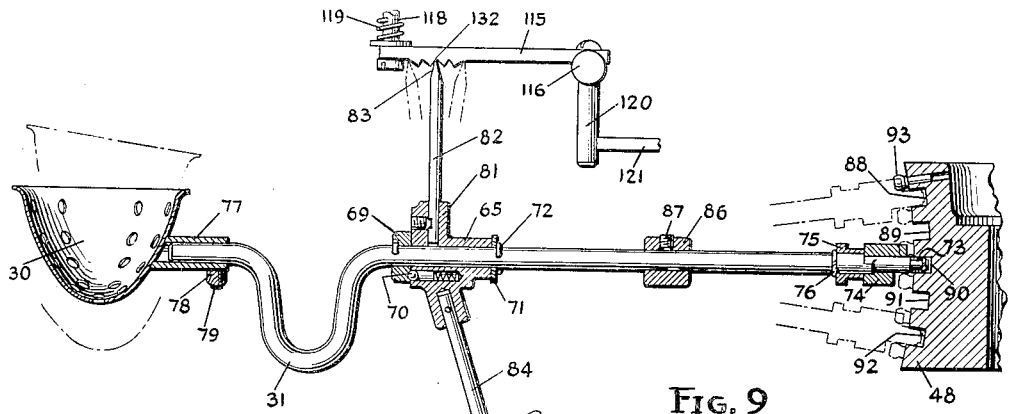
Fig. 9
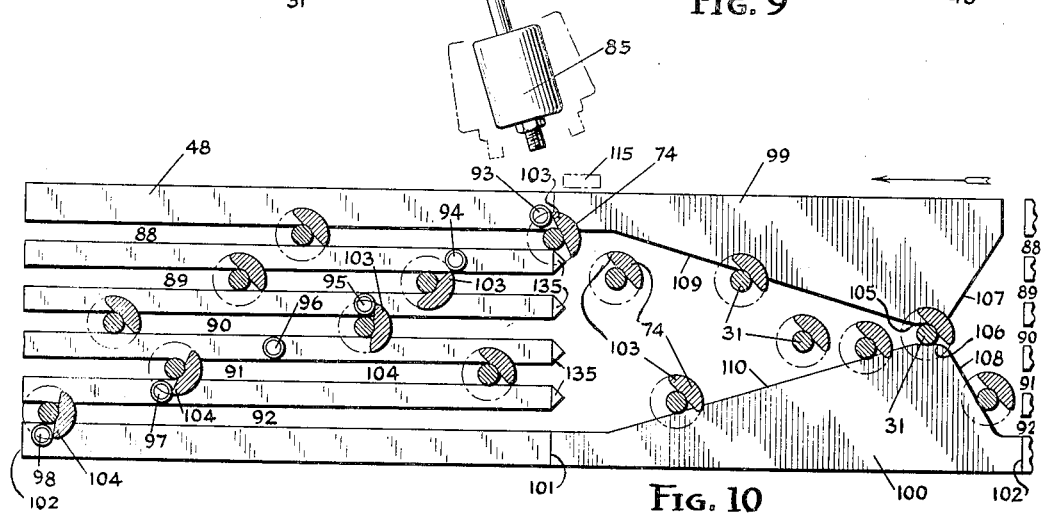
Fig. 10
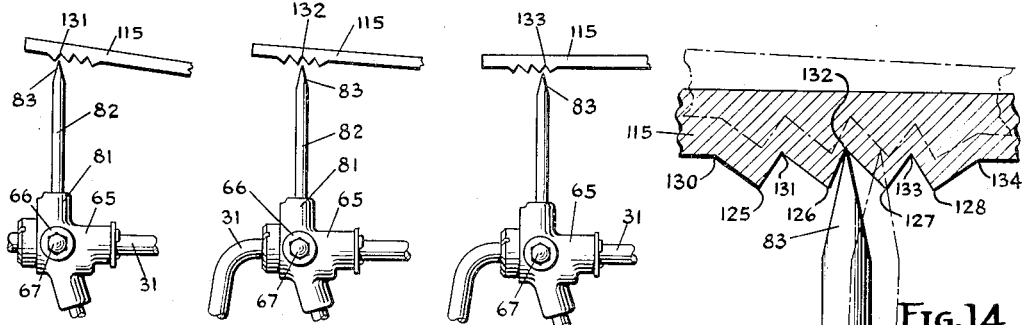
Fig. 11  Fig. 12  Fig. 13  Fig. 14
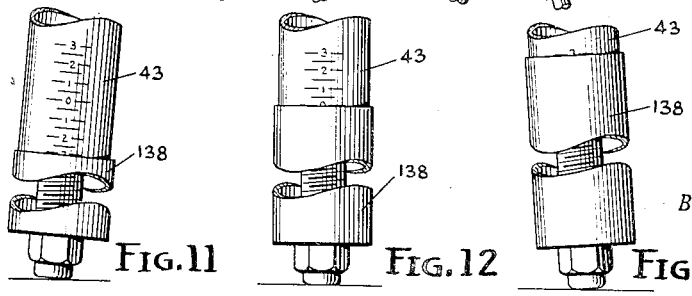
INVENTOR.
Charles A. Fausel
BY Frad O Fischer
ATTORNEYS.

Patented Oct. 31, 1939

2,178,203

UNITED STATES PATENT OFFICE 2,178,203

WEIGHING AND SORTING MACHINE

Charles A. Fausel, Glen Ridge, N. J.

Application August 25, 1937, Serial No. 160,789

5 Claims. (Cl. 209—121)

This invention relates to improvements in weighing and sorting machines adapted for automatically assorting, separating or classifying articles or materials into various grades or classes according to the weight of the article or material, in a rapid and efficient manner.

In the handling of foodstuffs, special precautions must be taken to meet sanitary requirements and provisions must be made to enable the efficient operation of sorting and weighing devices in damp and humid atmospheres, which are so prevalent in some types of food processing industries. The machine herein disclosed is particularly adapted for the assorting of oyster meats, clam meats, shrimp, and fish fillets.

But obviously the machine is adapted for use in many other situations.

Where natural food products are graded, considerable variations of the character of the article are encountered due to seasons, improper development or growth conditions, etc. As the appearance and weight of the product are effected, it is highly desirable that such products be separated into different grades.

It is, therefore, an object of this invention to provide a machine for automatically weighing and sorting various food products and other articles according to the weight thereof, and automatically discharging said articles into receptacles placed at predetermined positions.

As certain foodstuffs will absorb or lose varying percentages of weight during processing, thus increasing their count per unit measure, provisions are made to readily accommodate for such behavior.

To reduce complication in construction, the usual type of parallel link weighing mechanism is dispensed with and a simple lever type of mechanism is adopted. In so doing, specially constructed scale pans are provided to concentrate the mass of the article weighed, for all practical purposes, in a predetermined position and thus eliminate the inaccuracies ordinarily common to this method of weighing.

A further object is the provision in a weighing and sorting machine, of means to automatically disconnect the source of power should undue strain be placed upon the machine.

A further object is the provision of means for flushing the scale pan and other parts of the machine receiving articles, so that such articles will be easily discharged from the machine when desired.

Figure 2:
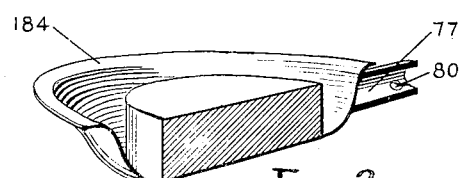
Figure 3:
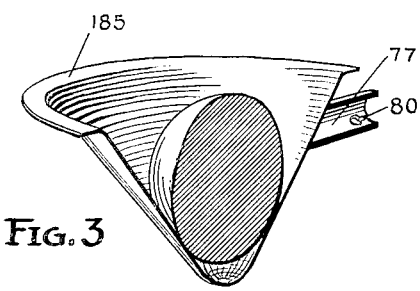
Figure 4:
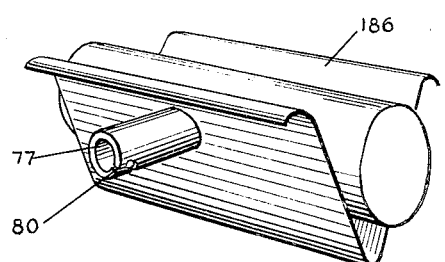
Figure 5:
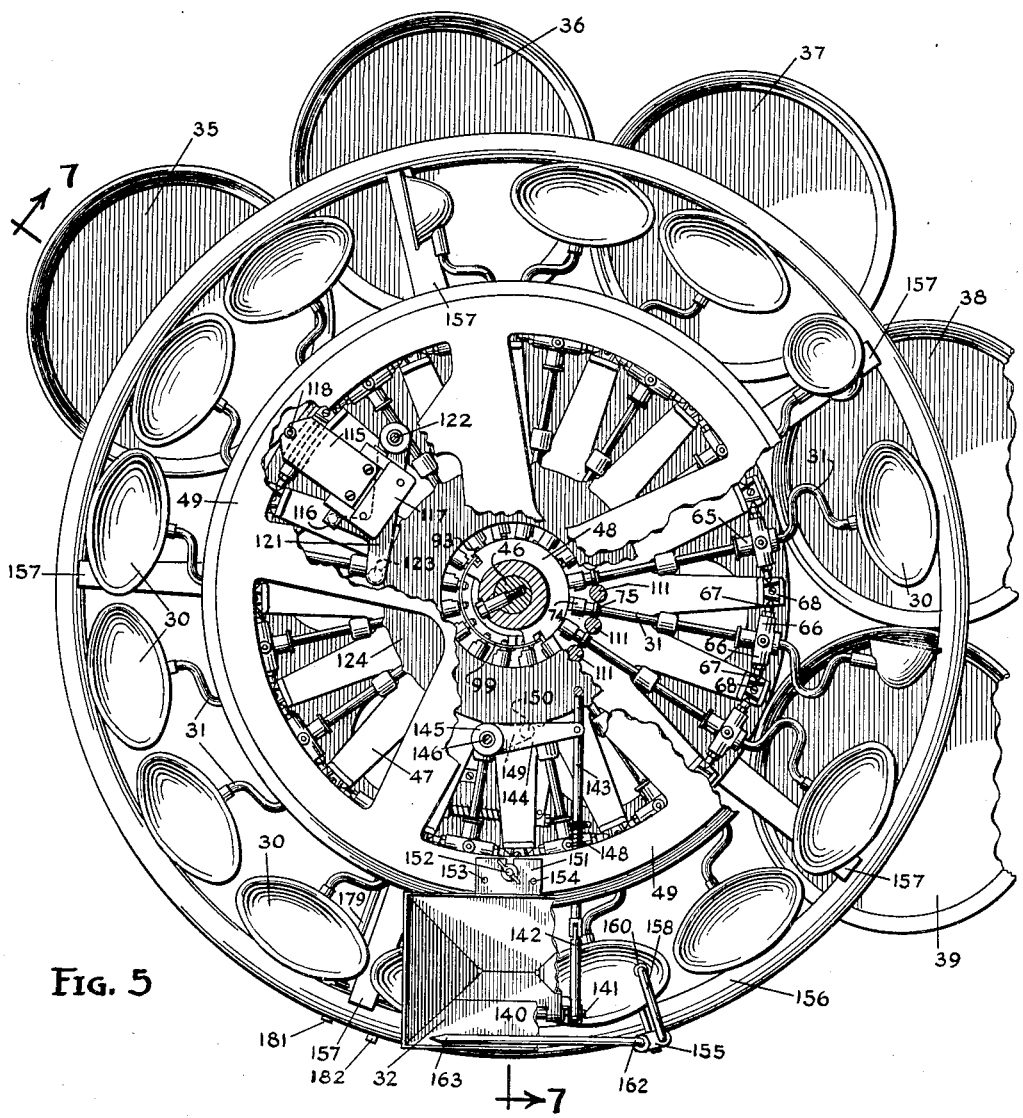
Figure 6:
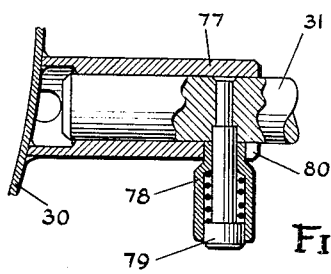
Figure 7:
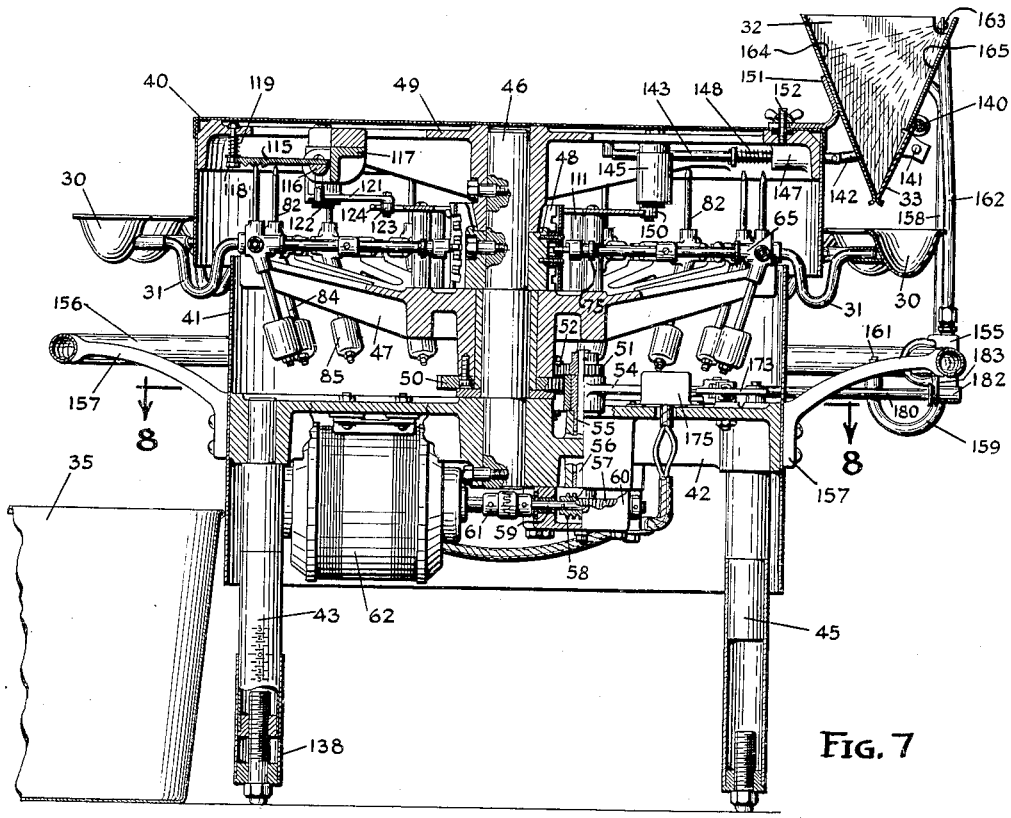
Figure 8:
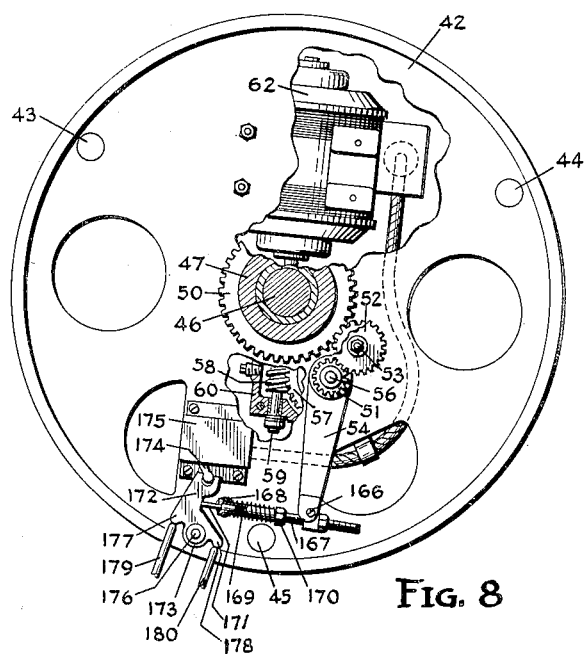

These and other advantageous objects, which will later appear, are accomplished by the simple and practical construction and arrangement of parts hereinafter described and exhibited in the accompanying drawings, forming part hereof, and in which:

Fig. 1 is a perspective view of the machine having the invention applied thereto, Figs. 2, 3 and 4 are perspective views showing different types of scale pans, Fig. 5 is a top plan view of the machine with the upper casing removed and portions partly broken away and in section, Fig. 6 is a sectional detail showing the means of detachably supporting various scale pans in position, Fig. 7 is a sectional elevation of the machine taken substantially on the line 7—7 of Fig. 5, Fig. 7—A is a fragmentary sectional detail illustrating the overload release mechanism, Fig. 8 is a top plan view of the base of the machine with parts broken away and in section taken substantially on line 8—8 of Fig. 7.

Fig. 9 is an enlarged fragmentary view showing in detail a complete scale mechanism, Fig. 10 is a stretch-out view of the scale track, Figs. 11, 12 and 13 are illustrative views showing the manner in which a percentage increase or decrease of the various grades may be accomplished by adjustment, and Fig. 14 is a fragmentary view to illustrate the cooperation between the grade selecting comb of the machine and the selector pin on the weighing mechanism.

As illustrated in Fig. 1, the machine comprises a series of scale pans 30 mounted on the beams 31 of the weighing mechanism. As viewed, the scale pans 30 rotate continuously from right to left passing beneath a hopper 32 which has a door 33 timed to open when a scale pan is in the proper position beneath it. An operator places the article to be graded in the hopper 32 from which it is deposited into a scale pan, and while being carried in the pan, the article is weighed and in accordance with its weight deposited in the various buckets 35, 36, 37, 38 and 39 (see also Figure 5) placed in predetermined positions around the periphery of the machine. An upper casing 40 laps over a lower casing 41 (see also Figure 7) and the scale beams 31 are formed to travel without interference in the space provided by the lap. The lap in the casing and the form in the scale beams are provided so that water or other fluid will shed from the machine and will not enter and be deposited on the interior mechanism.

Figure 7A:
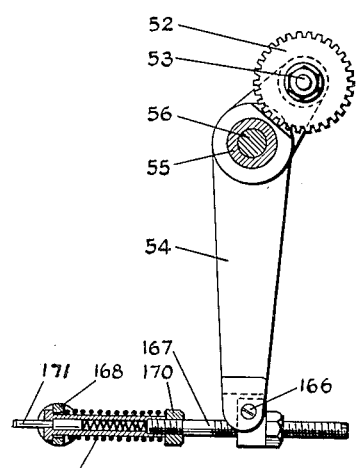

Referring particularly to Figures 7 and the machine has a base 42 supported by the three legs 43, 44 and 45. A stud 46 is fixed in the center of the base and mounted to turn freely thereon is a spider 47 (see also Figure 5) carrying a series of scale mechanisms of which the scale beam 31 is a part. Fixed also to the stud 46 is the scale track 48 and the sub-base 49. A gear 50 is fixed to the spider 47 and is driven by a pinion 51 through a set of intermediate gears 52 mounted on a stud 53 fixed on the short arm of the spring pressed lever 54. The lever 54 (see Fig. 7a) is freely mounted on a sleeve 55 fixed in the base 42, said sleeve also acting as a bearing for the shaft 56 on which is secured the pinion 51. The lower end of the shaft 56 carries a worm wheel 57 which meshes with a worm 58 fixed to a shaft 59 rotatably mounted in a gear housing 60 secured on the base 42. A coupling 61 is fixed at one end to the shaft 59 and at the other end to the shaft of a motor 62 suspended from the base 42. The motor, through the train of gears just described, drives the spider 47 and hence the scale pans 30 in a clockwise direction as viewed in Figure 5.

The scale mechanism

The scale mechanism is illustrated in Figure 9, and the scale beam 31 which is of circular cross-section is rotatably mounted in a carrier 65. The carrier 65 (see also Figure 5) has two extensions 66 in which are inserted adjustable pivots 67 that engage with pivot bearings 68 fixed to the arms of the spider 47. A collar 69 is secured to the scale beam 31 and a recess therein engages with a spring pressed detent 70 in the carrier 65. The engagement of the detent with the recess in the collar retains the scale pan 30 in its horizontal position and another recess (not shown) in the collar 69 spaced approximately at right angles to that illustrated will, on engagement with the detent 70, retain the scale pan in a vertical or discharging position when the scale beam 31 is rotated as hereinafter described. A washer 71 and cotter 72 retain the scale beam 31 in a fixed relation with the carrier 65 and prevent any axial displacement due to the pressure of the detent 70.

On the right hand end of the scale beam 31 as viewed in Figure 9 is a roller 73 and adjacent thereto is secured a lever 74. A stepped roller 75 is retained on the scale beam between the lever 74 and a clip 76. The scale pan 30 is detachably mounted to the left end of the scale beam 31 by means of a sleeve 77 which is an integral part of the pan. A spring pressed latch 78 (see also Figure 6) slidably mounted on the stud 79 fixed in the scale beam 31 engages with a formed slot 80 (as shown in Figures 2, 3, and 4) in the sleeve 77 to retain the pan in position. The pan 30 is readily removed for substitution or sterilization by forcing the latch 78 against its spring, thereby disengaging it from the circular end of the slot 80 and thus permitting the narrow portion of the slot to pass by the stud 79.

An extension 81 of the carrier 65 has affixed a selector rod 82 one end of which is formed in the shape of a knife-edge 83. The rod 82 assumes a fixed relationship to the position of the scale pan 30 and, as hereinafter described, determines the proper grade or class to which an article in the pan belongs. An angularly disposed, downwardly depending rod 84 is also secured to the carrier 65 and adjustably mounted thereon is a counterweight 85. The angle of the rod 84 is such that the force of gravity acting on the counterweight 85 will permit a practically uniform displacement of the scale pan 30 as equally graduated increments of weight are added to the pan. A balancing weight 86 is carried by the scale beam 31 and is adjustably secured by a set screw 87 in a convenient position. This weight permits the proper balancing of the scale mechanism should such adjustment be required due to any slight variations in weight of the component parts of the mechanism.

The scale track

The movements of the various scale mechanisms are controlled by the scale track 48. As shown in Figures 7, 9 and 10, the scale track has a series of five grooves 88, 89, 90, 91, and 92 which are disposed radially with respect to the center of oscillation of the scale mechanism. A groove is provided for each grade desired and although five grades are shown, it is obvious that the machine is not limited to that number. Fixed on the ridges between the grooves are pins 93, 94, 95, 96, 97 and 98, which, as will be later explained, trip the scale pans at predetermined places to discharge their contents. The inclined surfaces 99 and 100 are positioned between the entering end 101 and discharge end 102 of the grooves and control the scale mechanism while it is being loaded and being brought into a state of equilibrium. The grooves and the inclined surfaces encompass the end of the scale beams 31 and particularly, as shown in Fig. 9, the roller 73. When a scale beam 31 moves into engagement with a groove, an arm 103 (Figure 10) of the lever 74 is in position to be acted upon as, for instance, by one of the pins 93. Further movement of a scale beam 31 toward the left in Figure 10 causes it to be turned in a clockwise direction by the arm 103 as illustrated at the position of the pin 94. At the pin 95 is shown a scale beam partly rotated by engagement of the pin and arm 103. When a scale beam is rotated in this manner its corresponding scale pan 30 assumes a vertical position as shown in Figure 1 and enables the scale pan to discharge its contents. The scale pan 30 is returned to its horizontal position by an arm 104 of the lever 74 striking a pin as shown at the positions of pins 97 and 98. The pins 94 to 97 inclusive act in a dual capacity and are in position to discharge or return to normal a scale pan according to the particular groove with which a scale beam is associated, whereas the pin 93 will only be instrumental in discharging a scale mechanism in groove 88 and the pin 98 will only act to restore to normal a scale mechanism in groove 92.

The inclined surfaces 99 and 100 have lobes 105 and 106 respectively and at this position restrain the scale mechanism against oscillation by engaging the roller 73 of the scale beam 31. The hopper 32 (Figure 1) discharges its contents into a scale pan 30 while the scale mechanism is so restrained and thus no vibration of the scale mechanism can occur while the scale pan is being loaded. The inclined edges 107 and 108 respectively of the plates 99 and 100 act as cams to bring the scale mechanisms into loading position and the corresponding slightly inclined edges 109 and 110 support the scale mechanisms until they find their equilibrium level. When the scale mechanisms reach their equilibrium level, they will disengage from the inclines 109 or 110 and will continue to travel at that level toward the entering end 101 of the scale track without vibration.

Referring particularly to Figures 5 and 7, the stepped rollers 75 are positioned between a series of rods 111 fixed in the spider. These rollers 75 are normally clear of engagement with the rods 111 as such contact would, due to friction, interfere with the free movement of the scale mechanism. However, when one of the levers 74 strike any of the pins 93 to 98 inclusive the slight clearance between a roller 75 and a rod 111 is taken up and the roller, through engagement with the rod, assists in relieving the strain on the scale mechanism while the scale beam is being rotated from normal to discharge position or vice versa.

*Selecting mechanism*

The scale mechanism is directed to its proper groove in the scale track 48 by the selecting mechanism. This mechanism also provides a ready means for conveniently changing the relationship between the various grades and also permitting a percentage adjustment in all grades should such regulation be required due to a gain or loss in weight of the article during processing.

In Figs. 5, 7, and 9 a selecting comb 115 is detachably mounted on a shaft 116 which is free to turn in the bearings of a bracket 117 fixed on the sub-base 49. An adjustable stop 118 is secured in the sub-base 49 and a spring 119 urges the selecting comb in the position shown. An arm 120 depending from the shaft 116 is in the path of a cam lever 121, the lever being pivoted on at stud 122 fixed in the sub-base 49. A cam roll 123 mounted on the lever 121 engages with a multi-lobed cam 124 which is secured to the rods 111 thus causing the cam to rotate with the spider 47. The selecting comb 115 has a series of teeth with points 125, 126, 127 and 128 (see also Figure 14), the teeth being adapted to cooperate with the knife edges 83 on the selector rods 82 carried by the scale mechanisms. The roots 130, 131, 132, 133 and 134 of the teeth are equally spaced in a fixed position and when a knife-edge 83 is in engagement with one of the roots, the corresponding scale beam 31 of the scale mechanism will be aligned to enter one of the respective grooves 88, 89, 90, 91 and 92 of the scale track 48. As shown in Fig. 9, the root 132 of the selecting comb teeth is in engagement with the knife-edge 83 thus registering the scale beam 31 with the groove 90 in the scale track 48.

Just prior to the time that a scale mechanism is about to enter a groove in the leading edge 101 of the scale track 48 the teeth of the comb 115 are raised clear of the knife edge 83 (Fig. 12) through engagement of the roll 123 on the cam arm 121 with one of the lobes of the multi-lobed cam 124. As the scale mechanism continues toward the grooves the comb 115 is lowered by the spring 119 and registers the knife-edge 83 with one of the roots of the comb. As illustrated in Fig. 14, the dot-dash lines show a knife-edge 83 in the position occupied by the grade controlled between the tooth points 126 and 127. Further descent of the comb 115 urges the knife-edge along the inclined face of the tooth until it rests, as shown by the full lines, in the root 132. This particular relationship guides the scale mechanism into the groove 90 (Fig. 9), and, continued travel of the scale mechanism in that groove causes the discharge of the associated scale pan 30 in a predetermined place as the arm 103 (Fig. 10) strikes the pin 95. Thereafter, the movement of the scale mechanism forces the arm 104 into engagement with the pin 96 and returns the associated scale pan to its normal position. In Fig. 10, the relative position of the selecting comb with respect to the entering end 101 of the scale track is indicated by broken lines 115 and, to aid the comb in aligning the scale mechanism with the grooves, the bevelled members 135 are provided.

To change the relationship of the different grades the positions of the tooth points 125, 126, 127 and 128 are varied. For instance, in Fig. 14, if the point 127 was moved to the left, the grade between points 126 and 127 would receive fewer articles from the mass to be sorted and the grades between points 127 and 128 would receive more. In this manner any desired number of grade combinations may be obtained by substituting a selecting comb 115 with the required tooth point positions.

As previously stated the products graded may gain or lose a percentage of their weight during process and to provide for this variation during the sorting of the articles, novel means are incorporated in the machine. The machine is normally operated so that it is level and to secure this condition two of the three legs 44 and 45 (Figs. 1 and 7) have adjustment screws 136 and 137. The third leg 43 which, as shown in Fig. 7, is directly under the selecting mechanism position has an adjustable sleeve 138, and when the machine is level the upper end of the sleeve registers with the "0" marking on a scale engraved on the leg 43. The scale mechanism is of the gravity type and will assume a definite position when loaded regardless of the manner in which the machine proper stands. It is obvious from the construction of the machine that the grade to which a particular article belongs is determined only at the selecting mechanism position and should the relationship of the tooth points 125, 126, 127 and 128 be altered with respect to the knife-edge 83, the grade in which a given article is to be deposited may also be changed.

As illustrated in Figure 12, the sleeve 138 is on "0" position with respect to the leg 43 and the machine is in a level position. The knife-edge 83 of the scale mechanism is about to be urged by the selecting comb 115 into engagement with the tooth root 132. However, if the machine proper had been thrown out of level by adjusting the sleeve 138 as exaggerated in Fig. 11, the knife-edge 83 would now cooperate with the tooth root 131 thus causing the article carried by the scale mechanism to be deposited in a different grade. Likewise, if the machine had been set out of level in the opposite direction as shown in Fig. 13, the same article would be placed into a still different grade as the knife-edge 83 would now coact with the tooth root 133. The conditions represented in Fig. 11 would place a percentage of the lighter articles to the left of their normal position, thus lowering the quantity of articles in all grades, whereas the condition shown in Fig. 13 would permit a percentage of the heavier articles to be controlled by the comb points to the right of their normal position thereby lowering the count in all grades.

For purposes of illustration, the tilting of the machine has been greatly exaggerated and an article normally controlled by the tooth root 132 has been shown to be thrown by undue adjustment to the grades controlled by the tooth roots 131 and 133. By judicious adjustment of the sleeve 138, however, a slight tilting of the machine will produce corresponding percentage variations in the different grades. As an example, if the count in a particular grade should be one hundred per unit measure after processing and a five percent loss in weight must be provided for, the machine would be adjusted in a manner similar to that in Figure 13 until the count per unit measure was ninety-five. Likewise, should the article absorb a five percent gain in weight during process, an adjustment similar to that in Fig. 11 would be made until the count per unit measure would be one hundred and five.

Hopper mechanism

The articles to be sorted are placed singly in the hopper 32 (Figs. 1, 5 and 7) by the operator and at the proper time are deposited by the hopper into the scale pans 30 through the opening of the hopper door 33. The door 33 is pivoted on a shaft 140 fixed to the hopper and a retractable pin 141 connects the door to an adjustable link 142. An extension 143 of the link 142 is attached to the arm 144 of a lever 145 which is pivotally secured to the sub-base 49 by a stud 146. The link extension 143 passes through a guide and a collar fixed to the extension normally retains the door 33 in the closed position shown. The short arm 149 of the lever 145 carries a cam roll 150 which coacts with the multi-lobed cam 124. Rotation of the cam vibrates the lever 145, and, when a scale pan 30 is properly located beneath the hopper, the door 33 is opened through the mechanism just described and the article contained in the hopper is deposited in the scale pan.

The hopper 32 has affixed thereto a bracket 151 which detachably secures it to the sub-base 49 by means of the wing-nut and stud combination 152 and the locating pins 153 and 154. It is important that parts coming into contact with foodstuffs be easily removable for cleaning and sterilization. This is readily accomplished with respect to the hopper by retracting the pin 141 from the link 142 and loosening the wing-nut 152.

Spray

In handling articles of foodstuffs such as oyster meats, fish fillets, etc. small particles of meat become detached therefrom and may cling to the scale pans thus destroying the accuracy of the mechanism. Furthermore, the characteristics of such articles do not always lend themselves to ready discharge from the pans without some form of lubrication. To prevent the clinging of small particles and to provide lubrication to assist in discharge, a spray 155 (Figs. 1, 5, and 7) is mounted adjacent the hopper 32. The spray 155 is fixed to a ring 156 which is secured by a series of arms 157 to the machine base 42. The ring 156, incidentally, acts as a guard to prevent accidental injury to the scale pans 30 due to carelessness in removing or replacing the buckets 36 to 39 inclusive. The spray 155 carries two U-shaped tubular extensions 158 and 159 on which are fixed the spray nozzles 160 and 161. These nozzles eject a spray of water on the scale pans 30 just prior to loading position and free the pans of meat particles and other debris. The scale pans 30 are, in this instance, perforated as shown in Fig. 1 to prevent the accumulation of water in the buckets and to allow the meat particles and other debris to flush out. Due to this spraying, a film of water remains on the scale pan surface thereby easing the discharge of the articles mentioned.

As the machine is operated at fairly high speeds compared to the usual weighing mechanisms, provisions are also made to prevent any hesitation in the progress of articles, particularly those of the meaty nature mentioned, in their course through the hopper. This is necessary as the hesitation of one article in the hopper would cause the following to overtake it and as a result, the two articles would be deposited in one scale pan and thus destroy the accuracy of the grading. To obviate such a condition, a tube 162 leading from the spray 155 has an extension 163 which is located on one side of the mouth of the hopper 32. The extension has a series of fine holes (not shown) which spray thin films of water on the sides 164 and 165 of the hopper 32. These films of water lubricate the sides of the hopper and permit the meaty or tacky articles to pass through the hopper without hesitation should they inadvertently strike the hopper sides.

Overload mechanism

As shown in Figs. 7 and 8, the pinion 51 drives the spider gear 50 through the intermediate gears 52 which are mounted on a stud 53 fixed on the short arm of the spring pressed lever 54. A pin 166 secures one end of an adjustable link 167 to the end of the lever 54. The other end of the link 167 is slidably mounted in a guide 168 (see also Fig. 7A) fixed in the base 42 and a compression spring 169 between the guide 168 and a collar 170 on the link 167 urges the lever 54 in a counter-clockwise direction thus maintaining engagement between the intermediate gears 52 and the spider gear 50. A spring pressed pin 171 is slidably nested in a recess of the link 167 and is disposed to engage the arm 172 of the three armed lever 173. The outer end of the arm 172 is bifurcated to receive a switch lever 174 mounted on the switch box 175 fixed to the base 42. An electrical contact switch (not shown) is in series with the circuit of the machine motor 62 and is mounted within the switch box 175. The switch is controlled by the switch lever 174 and, in the position shown in Fig. 8, will make electrical contact to close the circuit of the motor 62 thus driving the pinion 51 and the spider gear 50 in a clockwise direction. As the pinion 51 turns and drives the intermediate gear 52, it tends to disengage the intermediate gear from the spider gear 50 by virtue of the lever 54 swinging about its axis. The lever 54 is prevented from swinging by the compression spring 169 which exerts sufficient force to maintain gear engagement during normal operating conditions. Should an unusual load impose itself on the mechanism driven by the spider gear, the extra gear tooth pressure will cause the intermediate gear 52 to ride out of contact with the spider gear 50 by compressing the spring 169 as the lever 54 swings about its axis. In so doing the link 167 slides in the sleeve 168 thus moving the arm 172 and the switch lever 174 to the left of the position as viewed in Fig. 8. This action breaks the circuit of the electrical contact switch and thereby stops the motor 62.

The lever 173 is pivoted on a stud 176 fixed in the base 42 and has a pair of arms 177 and 178. These arms are in position to be acted upon by a pair of push rods 179 and 180 which terminate in a pair of buttons 181 and 182 (see also Fig. 1) slidably mounted on a bracket 183 fixed on the ring 156. To re-establish the motor electrical circuit it is necessary to push the button 181 and the rod 179, acting on the arm 177, will return the switch lever 174 to the position shown in Figure 8. The buttons 181 and 182 are also used for manually controlling the starting and stopping of the machine. The spring pressed pin 171 is provided to permit the arm 172 to swing to the right should the link 167 remain in its switch disconnecting position due to the possibility of the gears 50 and 52 resting on their outer diameters after disengagement.

*Scale pans*

Due to the use of a simple lever weighing mechanism instead of the usual parallel link mechanism it is necessary to provide scale pans which will concentrate the mass of the article to be weighed in a predetermined poistion. In Fig. 1, the type adopted for such articles as oyster meats, clam meats, fish fillets, etc., which are of a characterless nature, is in the form of a segment of an ellipsoid of revolution. This shape will, due to the sloping arrangement of its sides, concentrate the mass of the article on the center line of the pan and all articles weighed therein are thus gauged from a fixed datum position. Another advantage of this type of pan is that it is readily cleaned and there are no crevices available to lodge bacteria which might be injurious to the articles handled.

In Fig. 2 the pan 184 is of circular shape and is adaptable for weighing disc-like articles. The pan 185 in Fig. 3 is concial in shape capable of handling spherical or similar articles and the pan 186, Fig. 4, being in the nature of a trough will readily accommodate cylindrical formed articles.

*Résumé of operation*

The machine is first set by proper adjustment of the counterweight 85 (Fig. 9), the balancing weight 86 and by providing a comb 115 with the desired spacing of the grade controlling tooth points 125, 126, 127 and 128. If required, a percentage increase or decrease in the count per unit measure of the grades may be had by throwing the machine out of level through adjustment of the leg sleeve 138.

An article to be sorted is then placed in the hopper 32 and, at the proper time, the door 33 is opened by the multi-lobed cam 124 cooperating with the associated mechanism. The article is dropped in a scale pan 30, the scale pans moving in a clock-wise direction as viewed in Fig. 1. As the article is being deposited, the scale mechanism is prevented from oscillating by the lobes 105 and 106 of the inclined surfaces 99 and 100 (Fig. 10) encompassing the end of the scale beam 31. As the scale mechanism continues its travel, the end of the scale beam 31 rides along the inclined edges 109 or 110 until the weight of the article is overcome by gravity acting upon the counter-weight 85. The scale mechanism, thus finding its natural balance, continues without oscillation in the space between the inclined edges toward the leading edge 101 of the scale track 48. Just prior to the entry of the scale mechanism into the leading edge of the scale track, the selecting comb 115 is vibrated by the multi-lobed cam acting through the mechanism provided and the proper tooth point 125, 126, 127 or 128 cooperates with the knife-edge 83 to align the scale mechanism with the selected groove 88, 89, 90, 91 or 92. The bevelled members 135 assist the scale mechanism to enter the proper groove, and, as rotation continues, one of the pins 93 to 98 inclusive will discharge and then return to normal position the scale pan 30 associated with that particular scale mechanism. In the machine disclosed, the pin 93 controls the discharge of articles into the bucket 35 and, similarly, pins 94, 95, 96 and 97 control, respectively, the discharge of articles into the buckets 36, 37, 38 and 39. The bucket 35 will receive the heaviest articles graded and the subsequent bucket will receive progressively lighter articles. Unless directed by the selecting mechanism into one of the grooves 88, 89, 90, 91, the scale mechanisms will be guided into the lower groove 92. In this groove the pins 97 and 98 will discharge and return to normal position such scale mechanisms thus removing any article that may have remained in the scale pan 30. Such action insures the presentation of an empty scale pan when it subsequently is carried to the hopper position to receive another charge.

The foregoing disclosure is to be regarded as descriptive and illustrative only, and not as restrictive or limitative of the invention, of which obviously embodiments may be constructed including many modifications, without departing from the spirit and scope of the invention herein set forth and denoted in the appended claims.

Having thus described my invention, what I claim as new and desire to secure by Letters Patent, is:

1. In a weighing and sorting machine, a beam, a material holder supported at one end of the beam, means for pivoting the beam intermediate its length, a weight suspended from the beam intermediate its length, detent means for holding the beam in various positions, an arm fixed to the beam adjacent the other end thereof, a plurality of grooves for receiving and guiding the end of the beam adjacent the arm when the beam is tilted to predetermined positions, means for moving said end of the beam through one of said guide grooves, means to engage the arm on the beam to rotate the beam about its longitudinal axis when the beam has been moved at predetermined distance in one of said grooves, and means to periodically disengage said detent means to enable the beam to be returned to its normal position.

2. In a weighing and sorting machine, weighing means including a material holder, a grade preselecting device associated with said weighing means, said device comprising a pivotally mounted selecting comb having a plurality of teeth, a member carried by said weighing means to selectively engage one of said teeth depending upon the weight of the material in the material holder, and means to periodically tilt the comb to engage the member with the comb.

3. In a weighing and sorting machine, weighing means including a material holder, a grade preselecting device associated with said weighing means, said device comprising a constantly vibrating selecting comb having a plurality of teeth, a member carried by said weighing means to selectively engage one of said teeth depending upon the weight of the material in the material holder, means to periodically cause the comb to engage the member, said machine having a plurality of supporting legs, and means to adjust said legs longitudinally to vary the machine from its normal level position to provide selection at points intermediate the normal selection provided by the teeth of the comb when the machine is in a level position.

4. In a weighing and sorting machine, weighing means including a material holder, a grade preselecting device associated with said weighing means, said device comprising a constantly vibrating selecting comb having a plurality of teeth, a member carried by said weighing means to selectively engage one of said teeth depending upon the weight of the material in the material holder, said machine having a plurality of legs having telescoping portions, and means to adjust said telescoping portions longitudinally to vary the machine from its normal level position to provide selection at points intermediate the normal selection provided by the teeth of the comb when the machine is in level position.

5. In a weighing and sorting machine, weighing means including a material holder, a grade preselecting device associated with said weighing means, said device comprising a straight bar having a plurality of teeth in a row, means for oscillating and constantly vibrating said bar, a member carried by said weighing means to selectively engage one of said teeth depending upon the weight of the material in the material holder, and means to periodically cause the bar to engage the member.

CHARLES A. FAUSEL.